(12) United States Patent
Briglia et al.

(10) Patent No.: US 9,903,648 B2
(45) Date of Patent: Feb. 27, 2018

(54) METHOD AND DEVICE FOR SEPARATING A MIXTURE CONTAINING CARBON DIOXIDE BY MEANS OF DISTILLATION

(71) Applicant: L'Air Liquide, Societe Anonyme Pour l'Etude et l'Exploitation des Procedes Georges Claude, Paris (FR)

(72) Inventors: Alain Briglia, Hangzhou (CN); Arthur Darde, Paris (FR); Frederick Lockwood, Paris (FR); Xavier Traversac, Paris (FR)

(73) Assignee: L'AIR LIQUIDE SOCIETE ANONYME POUR L'ETUDE ET L'EXPLOITATION DES PROCEDES GEORGES CLAUDE, Paris (FR)

( * ) Notice: Subject to any disclaimer, the term of this patent is extended or adjusted under 35 U.S.C. 154(b) by 625 days.

(21) Appl. No.: 14/384,191

(22) PCT Filed: Mar. 5, 2013

(86) PCT No.: PCT/FR2013/050462
§ 371 (c)(1),
(2) Date: Sep. 10, 2014

(87) PCT Pub. No.: WO2013/135993
PCT Pub. Date: Sep. 19, 2013

(65) Prior Publication Data
US 2015/0059402 A1  Mar. 5, 2015

(30) Foreign Application Priority Data
Mar. 13, 2012 (FR) ...................... 12 52251

(51) Int. Cl.
*F25J 1/00* (2006.01)
*F23L 7/00* (2006.01)
*F25J 3/02* (2006.01)

(52) U.S. Cl.
CPC ............ *F25J 1/0027* (2013.01); *F23L 7/007* (2013.01); *F25J 3/0223* (2013.01); *F25J 3/0252* (2013.01);
(Continued)

(58) Field of Classification Search
CPC .. F25J 2200/78; F25J 2210/70; F25J 2220/84; F25J 2270/80; F25J 3/0266
See application file for complete search history.

(56) References Cited

U.S. PATENT DOCUMENTS

| | | | |
|---|---|---|---|
| 3,130,026 A | 4/1964 | Becker | |
| 3,498,067 A | 3/1970 | Ranke | |
| 4,441,900 A * | 4/1984 | Swallow | .................. C07C 7/09 62/622 |
| 6,035,662 A * | 3/2000 | Howard | ................. F25J 3/0223 62/617 |

(Continued)

FOREIGN PATENT DOCUMENTS

| | | |
|---|---|---|
| DE | 3639779 | 6/1988 |
| EP | 0965564 | 12/1999 |

(Continued)

OTHER PUBLICATIONS

International Search Report and Written Opinion for PCT/FR2013/050462, dated Jul. 27, 2015.

*Primary Examiner* — Tareq Alosh
(74) *Attorney, Agent, or Firm* — Justin K. Murray

(57) ABSTRACT

According to certain embodiments of the invention, a gas containing at least 50% of carbon dioxide is cooled in a first exchanger so as to produce a cooled fluid, a liquid derived from the cooled fluid is sent to a distillation column to be separated therein, a head gas is withdrawn from the distillation column and reheated in the first exchanger, a vat liquid, which is richer in carbon dioxide than the gas (Continued)

containing at least 50% of carbon dioxide, is withdrawn and at least a portion thereof is heated in the first exchanger, at least a first portion of the vat liquid is vaporized in the first exchanger in order to produce a vaporized portion, the vaporized portion is sent back to the column and an NOx removal column is supplied with the liquefied cycle gas produced by vaporizing and reliquefying the vat liquid from the column.

7 Claims, 4 Drawing Sheets

(52) U.S. Cl.
CPC .......... *F25J 3/0266* (2013.01); *F25J 2200/02* (2013.01); *F25J 2200/04* (2013.01); *F25J 2200/40* (2013.01); *F25J 2200/70* (2013.01); *F25J 2200/78* (2013.01); *F25J 2205/04* (2013.01); *F25J 2205/30* (2013.01); *F25J 2210/04* (2013.01); *F25J 2210/70* (2013.01); *F25J 2220/82* (2013.01); *F25J 2220/84* (2013.01); *F25J 2230/30* (2013.01); *F25J 2235/80* (2013.01); *F25J 2240/90* (2013.01); *F25J 2245/02* (2013.01); *F25J 2270/02* (2013.01); *F25J 2270/80* (2013.01); *Y02C 10/12* (2013.01)

(56) References Cited

U.S. PATENT DOCUMENTS

| | | | | |
|---|---|---|---|---|
| 6,070,431 | A | * | 6/2000 | Howard ................ F25J 3/0266 62/620 |
| 2002/0059807 | A1 | | 5/2002 | Wong et al. |
| 2006/0101851 | A1 | * | 5/2006 | Howard ................ F25J 3/0252 62/617 |
| 2007/0232706 | A1 | * | 10/2007 | Shah ................ B01D 53/0476 518/703 |
| 2008/0196584 | A1 | | 8/2008 | Ha |
| 2009/0013717 | A1 | | 1/2009 | Darde et al. |
| 2011/0023539 | A1 | | 2/2011 | White et al. |
| 2011/0167868 | A1 | * | 7/2011 | Pierce ................ F25J 3/0209 62/620 |

FOREIGN PATENT DOCUMENTS

| | | | | |
|---|---|---|---|---|
| EP | 0994318 | | 4/2000 | |
| EP | 1953486 | | 8/2008 | |
| EP | 2 381 198 | | 10/2011 | |
| FR | 2 926 876 | | 7/2009 | |
| FR | 2934170 | | 1/2010 | |
| FR | 2975478 | A1 * | 11/2012 | ............ F25J 1/0027 |
| JP | 56077673 | | 6/1981 | |
| WO | WO 2006054008 | | 5/2006 | |
| WO | WO 2007126972 | | 11/2007 | |
| WO | WO 2010070226 | A1 * | 6/2010 | ........... B01D 53/002 |

* cited by examiner

METHOD AND DEVICE FOR SEPARATING A MIXTURE CONTAINING CARBON DIOXIDE BY MEANS OF DISTILLATION

CROSS REFERENCE TO RELATED APPLICATIONS

This application is a § 371 of International PCT Application PCT/FR2013/050462, filed Mar. 5, 2013, which claims priority to FR1252251, filed Mar. 13, 2013, both of which are herein incorporated by reference in their entireties.

TECHNICAL FIELD OF THE INVENTION

The present invention relates to a process and device for the separation of a mixture comprising carbon dioxide by distillation comprising a stage of removal of $NO_x$.

BACKGROUND

It is known to separate a mixture comprising carbon dioxide as one of the main components by distillation. All the percentages relating to purities are molar percentages.

The mixture can comprise at least 50% of carbon dioxide, indeed even at least 70% of carbon dioxide and even at least 90% of carbon dioxide. The remainder of the gas can comprise at least one of the following gases: nitrogen, oxygen, argon or hydrogen. The mixture can originate from an oxy-combustion process in which a mixture of oxygen and fuel burns in a boiler to produce a waste gas, the mixture to be separated of the invention constitutes at least a portion of which, produced after purification.

A fluid rich in carbon dioxide can comprise at least 80% of carbon dioxide, indeed even at least 95% of carbon dioxide.

The majority of the processes of this type using distillation to purify the mixture use a distillation column, the bottom of which is heated by the mixture to be distilled.

In the case of U.S. Pat. No. 3,498,067, DE-A-3639779 and JP-A-56077673, the mixture is sent into the column and, for the documents FR-A-2 934 170, EP-A-1 953 486, US20020059807, U.S. Pat. No. 3,130,026, WO2006054008, WO2007126972, EP-A-0 965 564 and EP-A-0 994 318, the bottom liquid vaporizes against the mixture in a dedicated exchanger, separated from another larger exchanger which is used to cool the mixture.

U.S. Pat. No. 4,441,900 describes a process according to the preamble of the first independent claim.

SUMMARY OF THE INVENTION

According to the invention, a process for the separation of a gas comprising carbon dioxide by distillation is provided, in which:

i) the gas comprising at least 50% of carbon dioxide is cooled in a first exchanger in order to produce a cooled fluid; a liquid derived from the cooled fluid is sent to a distillation column in order to be separated therein, ii) a top gas is withdrawn from the distillation column and is reheated in the first exchanger, iii) a bottom liquid enriched in carbon dioxide with respect to the gas comprising at least 50% of carbon dioxide is withdrawn and at least a portion thereof is reheated in the first exchanger, iv) at least a first portion of the bottom liquid is evaporated in the first exchanger in order to produce an evaporated portion and the evaporated portion is returned to the column, v) a second portion of the bottom liquid is sent to the first exchanger where it is reheated and evaporates and the gas thus formed is compressed in order to form a gaseous product rich in carbon dioxide, vi) the cooling and optionally the condensation is carried out of a portion of the compressed gas forming a cycle gas; the portion is subsequently cooled in the first exchanger, at least a portion thereof is reduced in pressure and it is returned to evaporate in the first exchanger in order to form a refrigeration cycle, and vii) the liquid is derived from the cooled fluid by sending the cooled fluid to a column for removal of $NO_x$, by taking the top gas from the column and by sending it to at least one phase separator and by taking the liquid in one of the phase separators, characterized in that the column for removal of $NO_x$ is a stripping column, fed at the top with liquefied cycle gas.

According to other optional characteristics:

- at least a portion of the top gas reheated in the first exchanger is mixed with the gas comprising carbon dioxide upstream of the first exchanger,
- the liquid is derived from the cooled fluid by sending the cooled fluid to at least one phase separator and by taking the liquid in one of the phase separators,
- a gas from one of the phase separators is reheated in the first exchanger and is reduced in pressure in a turbine (19F, 19G),
- the gas originates from an oxy-combustion boiler and the bottom liquid from the column for removal of $NO_x$ is returned to the boiler.

According to another subject matter of the invention, a device for the separation of a gas comprising at least 50% of carbon dioxide by distillation is provided which comprises a first exchanger in order to cool the gas in order to produce a cooled fluid, means for deriving a liquid from the cooled fluid, a distillation column, a pipe for sending the liquid derived from the cooled fluid to the column, a top gas pipe for withdrawing a top gas from the distillation column, the top gas pipe being connected to the first exchanger in order to reheat the top gas or a gas derived from the top gas in the first exchanger, a liquid pipe for withdrawing a bottom liquid enriched in carbon dioxide with respect to the gas, the liquid pipe being connected to the first exchanger in order to reheat the liquid in the first exchanger, a pipe connected to the first exchanger and to the column in order to return the evaporated liquid to the distillation column, a pipe for sending a second portion of the bottom liquid to the first exchanger where it is reheated and evaporates, a compressor for compressing the gas thus formed in order to form a gaseous product rich in carbon dioxide, means for cooling and optionally condensing a portion of the compressed gas forming a cycle gas, means for sending the portion of cooled compressed gas to the first exchanger, pressure-reducing means for reducing in pressure at least a portion of the cooled compressed gas and for returning it to evaporate in the first exchanger in order to form a refrigeration cycle, a column for removal of $NO_x$, a pipe for sending the cooled liquid to the column for removal of $NO_x$, the means for deriving a liquid consisting of at least one phase separator, a pipe for withdrawing a top gas from the column for removal of $NO_x$ and for sending it to at least one phase separator, a pipe for exiting the liquid from one of the phase separators, characterized in that the column for removal of $NO_x$ is a stripping column and in that the device comprises a pipe for feeding the column at the top with liquefied cycle gas.

According to other optional subject matters, the device comprises:
- means for mixing at least a portion of the top gas reheated in the first exchanger with the gas comprising carbon dioxide upstream of the first exchanger (for example, two pipes which meet),
- a pipe for sending the cooled fluid to at least one phase separator and a pipe for sending the liquid in one of the phase separators to the distillation column,
- a pipe for sending a gas from one of the phase separators to be reheated in the first exchanger, a turbine and a pipe for sending the reheated gas to the turbine,
- at least one phase separator, a pipe for sending the cooled fluid to the phase separator(s) and a pipe for sending a liquid derived from the cooled fluid from the phase separator(s) to the column,
- a turboexpander for a gas originating from a phase separator,
- a column for removal of $NO_x$ fed with the cooled fluid and connected to a phase separator in order to produce the liquid, the phase separator being connected to the distillation column.

According to another subject matter of the invention, an oxy-combustion device is provided which comprises an oxy-combustion boiler, a pipe for sending a gas from the boiler to a device as claimed in one of claims 6 to 9 and a pipe for sending the bottom liquid from the column for removal of $NO_x$ to the boiler.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

The invention will be described in more detail with reference to FIGS. 1 to 3, which represent comparative devices, and FIG. 4, which represents a device according to the invention.

In all these Figures, the column for separation of carbon dioxide and oxygen or carbon monoxide does not comprise a bottom reboiler, the bottom liquid being evaporated solely in the main exchanger of the device where the top gas from the distillation column is reheated.

Figure 1:
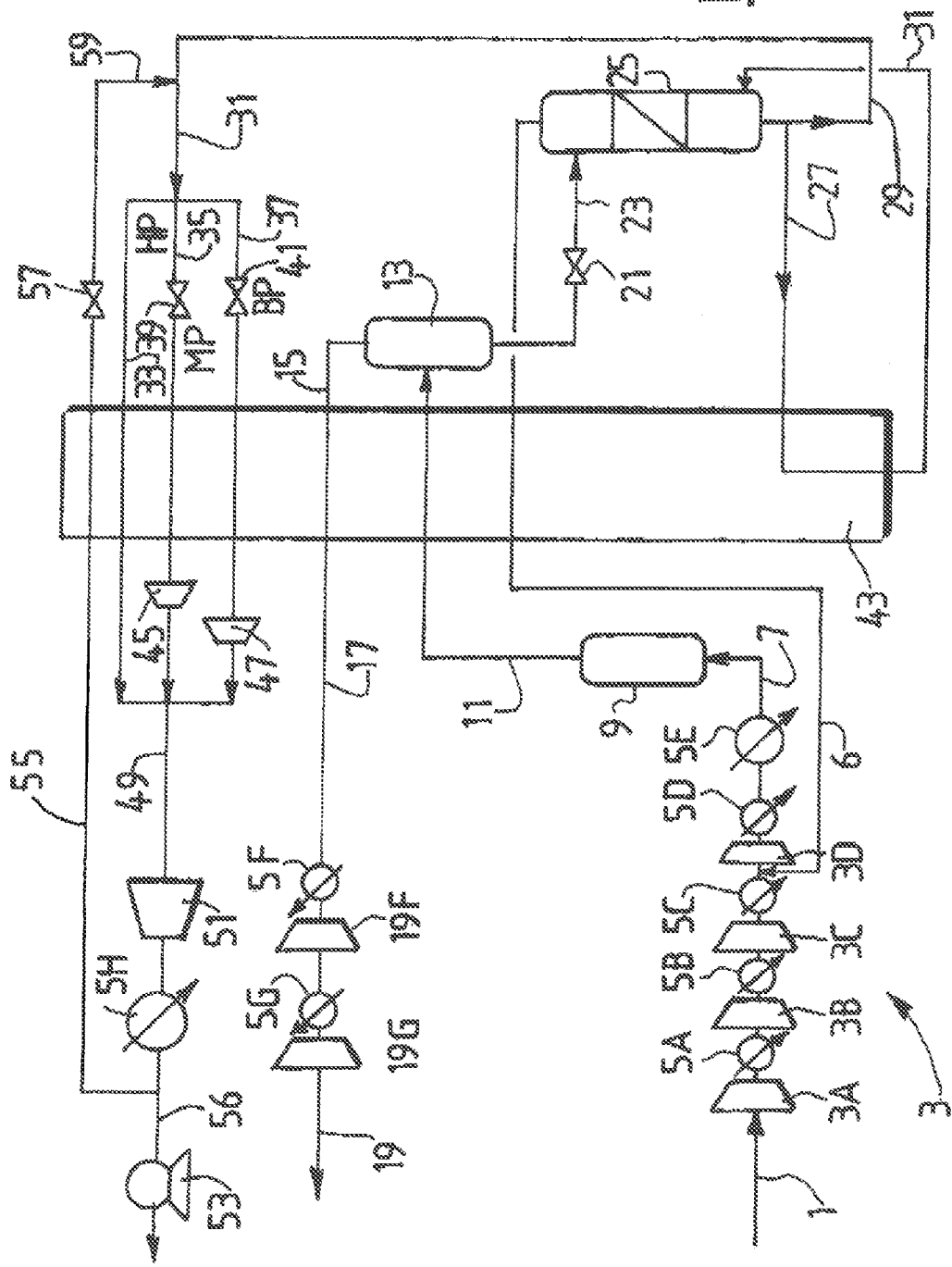
FIG. 1 shows an embodiment of the invention.

In FIG. 1, a wet gas 1 comprising carbon dioxide and oxygen or carbon monoxide is compressed in a compressor 3. This compressor 3 comprises four stages 3A, 3B, 3C, 3D, each being followed by a cooling means 5A, 5B, 5C, 5D. After cooling in the cooling means 5D, the gas 1 is cooled by the cooler 5E in order to form the gas 7 and is sent into a purification unit 9 in order to remove the moisture. The dry gas 11 formed is cooled in a first exchanger 43 where it is cooled and is partially condensed. The partially condensed gas is sent to a phase separator 13. The liquid from the phase separator 13 is sent to a valve 21 in order to form the liquid 23 which feeds the distillation column 25 at the top.

A gas enriched in oxygen and/or carbon monoxide 26 is withdrawn from the top of the column and sent upstream of the cooler 5D. Alternatively, it can be returned to the oxy-combustion unit from which the gas 1 originates.

The bottom liquid 27 from the column 25, rich in carbon dioxide, is sent to the first exchanger 43 where it is evaporated in order to form the flow 31 which is returned at the bottom of the column 25 after reduction in pressure in the valve 32.

The remainder of the bottom liquid 29 is not heated in the exchanger but is mixed with a cycle fluid 51. The mixture 31 formed is divided into three portions. The portion 37 is reduced in pressure by the valve 41 to a low pressure, evaporated in the first exchanger 43 and then compressed in a compressor 47. The portion 35 is reduced in pressure by the valve 39 to a medium pressure, evaporated in the first exchanger 43 and then compressed by a compressor 45. The portion 33 is evaporated in the first exchanger 43 without having been reduced in pressure and is then mixed with the two compressed portions. The mixture 49 thus formed is compressed in a compressor 51, condensed and then divided into two. A portion 56 is pressurized by a pump 53 in order to form a liquid product. The remainder 55 is cooled in the first exchanger 43, is reduced in pressure in the valve 57 and is mixed with the flow 29 in order to be returned to the first exchanger 43, as refrigeration cycle.

The gas 15 from the phase separator 13 is reheated in the first exchanger 43 in order to form a flow 17 which is reheated by the reheaters 5F, 5G and reduced in pressure by two turbines 19F, 19G in series, in order to form the pressure-reduced flow 19.

Figure 2:
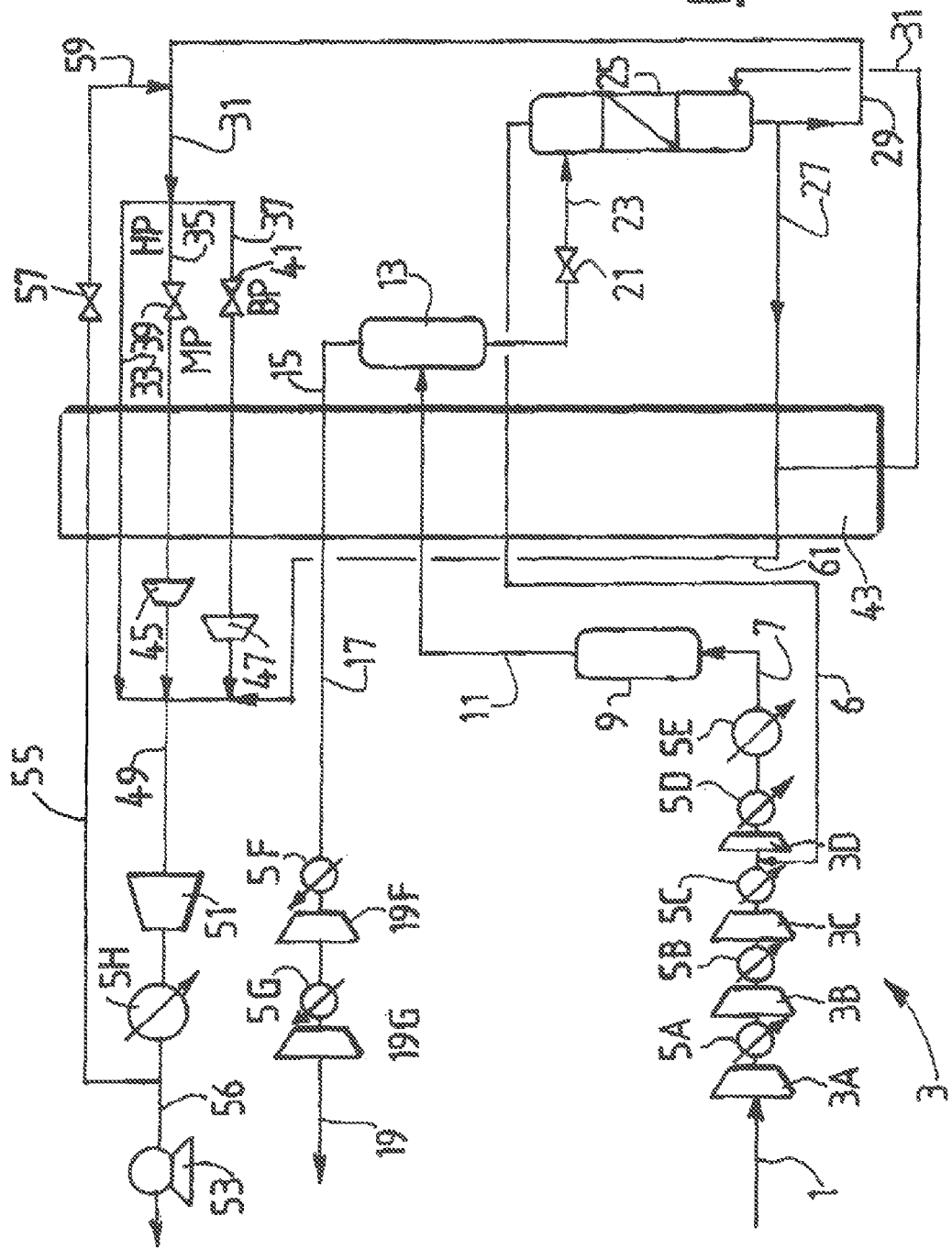
FIG. 2 shows an embodiment of the invention.

In FIG. 2, unlike FIG. 1, a portion 61 of the bottom liquid 27 is evaporated and reheated by passing entirely through the first exchanger 43 in order to be sent downstream of the compressor 47 as flow 61 which is sent downstream of the compressor 47. This alternative form is of particular advantage as this avoids subcooling the liquid which is evaporated at the pressure of the column (in particular if the fluid 33 is reduced to zero; this will thus relieve the cooled end of the exchanger and improve the liquefaction energy. This is because the subcooling is only justified when the liquid is reduced in pressure as then the portion converted into vapor is reduced, indeed even is eliminated.

Figure 3:
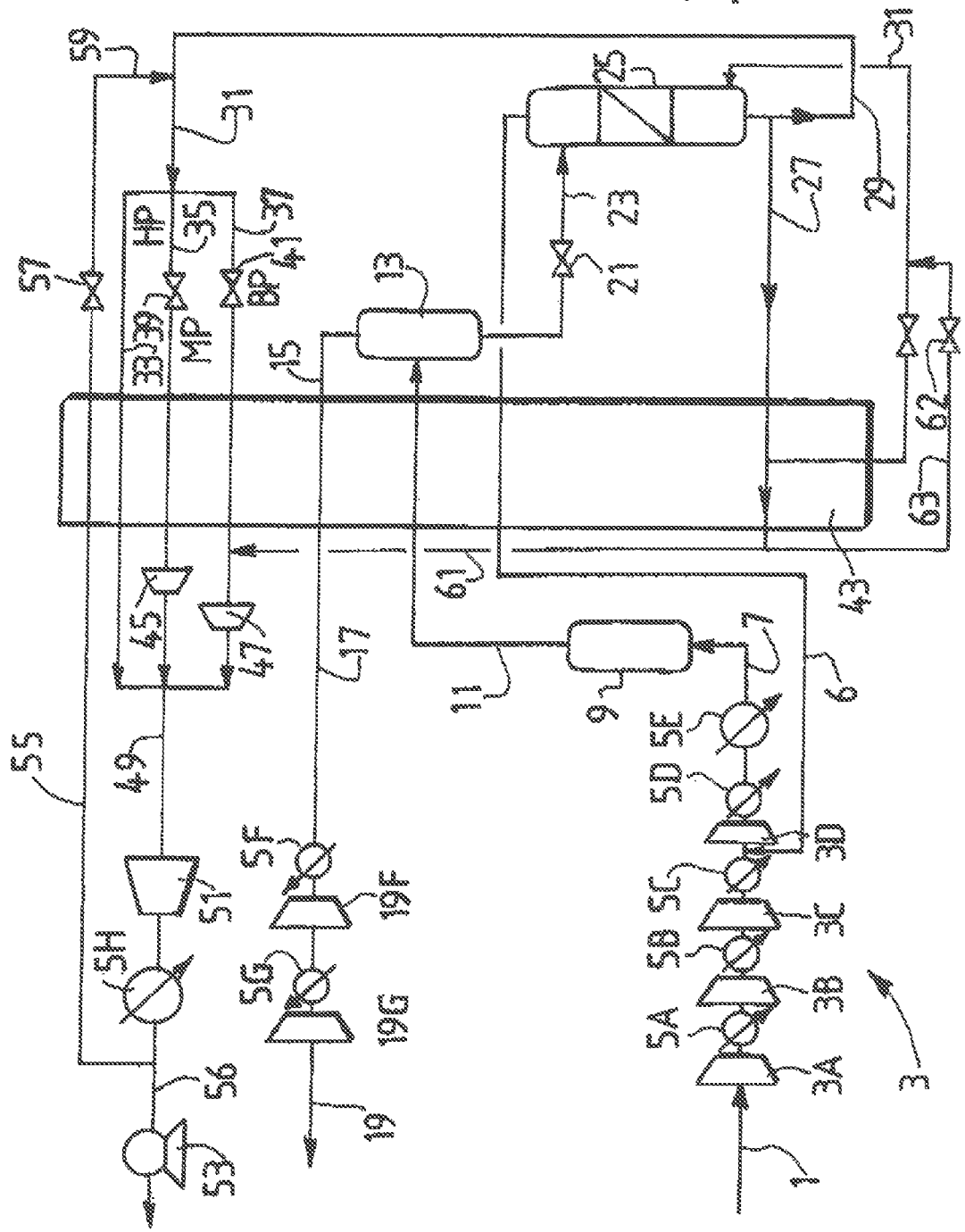
FIG. 3 shows an embodiment of the invention.

In FIG. 3, unlike FIG. 2, a portion 63 of the evaporated liquid 61 is returned to the bottom of the column 25 without having been cooled in the exchanger 43 but after reduction in pressure in a valve 62. This alternative form is of particular advantage in controlling the temperature of the reboiling gas.

It is also possible to divide the bottom liquid 27 into at least two portions, one being evaporated in the exchanger 43 and then returned to the column 25 and another portion, optionally the remainder, being treated in a second distillation column in order to produce a product rich in carbon dioxide.

Figure 4:
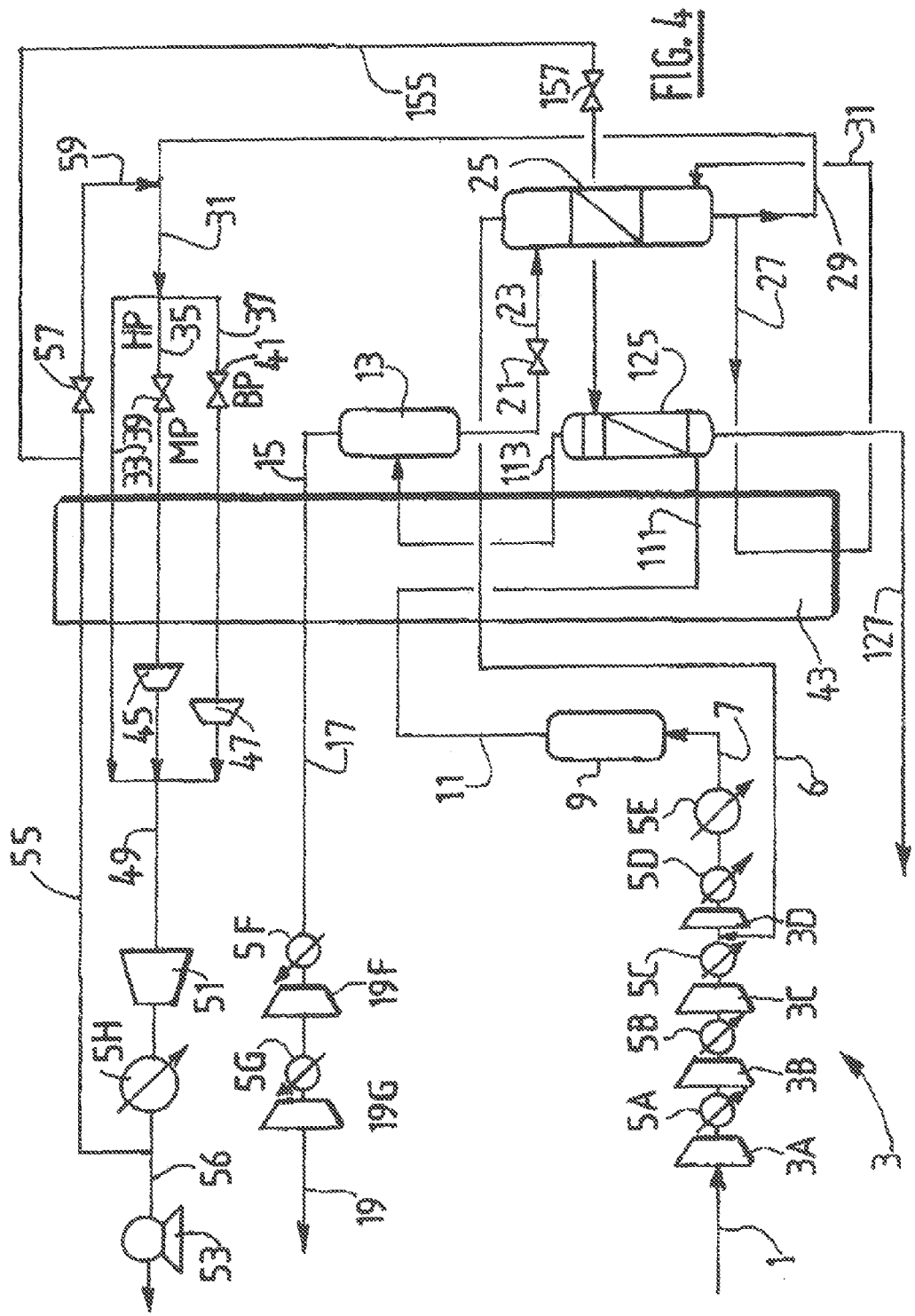
FIG. 4 shows an embodiment of the invention.

FIG. 4 shows the case where the process makes it possible to purify the mixture from NO with a dedicated column 125 upstream of the separation in the column 25. The dedicated column 125 is a column for removal of $NO_x$. A column for removal of $NO_x$ makes it possible to reduce the NO and/or $NO_2$ and/or $N_2O$ content of the gas entering the column. The wet gas 1 comprising carbon dioxide and oxygen or carbon monoxide is compressed in a compressor 3. This compressor 3 comprises four stages 3A, 3B, 3C, 3D, each being followed by a cooling means 5A, 5B, 5C, 5D. After cooling in the cooling means 5D, the gas 1 is cooled by the cooler 5E in order to form the gas 7 and is sent into a purification unit 9 in order to remove the moisture. The dry gas 11 formed is cooled in a first exchanger 43 and then withdrawn at an intermediate level of the exchanger 43 in order to be sent into the bottom of the column 125. The column 125 is a simple column devoid of bottom reboiler or top condenser. It acts as stripping column in order to purify the gas 11 from $NO_x$. A liquid enriched in NO 127 is withdrawn at the bottom of the column 125 and is sent to the boiler which is the source of the gas 1 or, if not, is stored. The gas purified from $NO_x$ 113 exits from the top of the column 125, is cooled in the exchanger 43 and is partially condensed. The partially condensed gas is sent to a phase separator 13. The liquid from the phase separator 13 is sent to a valve 21 in order to form the liquid 23 which feeds the distillation column 25 at the top.

A gas enriched in oxygen and/or carbon monoxide 26 is withdrawn from the top of the column and sent upstream of the cooler 5D. Alternatively, it can be returned to the oxy-combustion unit from which the gas 1 originates. This gas can be separated by permeation or other means in order to form another gas which will be reheated.

The bottom liquid 27 from the column 25, rich in carbon dioxide, is sent to the first exchanger 43 where it is evaporated in order to form the flow 31 which is returned at the bottom of the column 25 after reduction in pressure in the valve 32.

A portion of the bottom liquid 29 is mixed with the fluid 50 and then divided into three portions. The portion 37 is reduced in pressure by the valve 41 to a low pressure, evaporated in the first exchanger 43 and then compressed in a compressor 47. The portion 35 is reduced in pressure by the valve 39 to a medium pressure, evaporated in the first exchanger 43 and then compressed by a compressor 45. The portion 33 is evaporated in the first exchanger 43 without having been reduced in pressure and is then mixed with the two compressed portions. The mixture 49 thus formed is compressed in a compressor 51, condensed and then divided into two. A portion 56 is pressurized by a pump 53 in order to form a liquid product. The remainder 55 is cooled in the first exchanger 43 and is then divided into two. A portion 59 is reduced in pressure in the valve 57 and mixed with the flow 29 in order to be returned to the first exchanger 43, as refrigeration cycle.

Another portion 155 is reduced in pressure in a valve 157 and then conveyed into the top of the column for removal of $NO_x$ 125 in the liquid form.

The gas 15 from the phase separator is reheated in the first exchanger 43 in order to form a flow 17 which is reheated by the reheaters 5F, 5G and reduced in pressure by two turbines 19F, 19G in series, in order to form the pressure-reduced flow 19.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary a range is expressed, it is to be understood that another embodiment is from the one.

Optional or optionally means that the subsequently described event or circumstances may or may not occur. The description includes instances where the event or circumstance occurs and instances where it does not occur.

Ranges may be expressed herein as from about one particular value, and/or to about another particular value. When such particular value and/or to the other particular value, along with all combinations within said range.

All references identified herein are each hereby incorporated by reference into this application in their entireties, as well as for the specific information for which each is cited.

The invention claimed is:

1. A process for the separation of a gas comprising carbon dioxide by distillation, the process comprising the steps of:
   i) cooling the gas comprising carbon dioxide in a first exchanger to produce a first cooled fluid, wherein the gas comprising carbon dioxide is at least 50% carbon dioxide;
   ii) withdrawing the cooled fluid from an intermediate level of the first exchanger and introducing the first cooled fluid to a stripping column under conditions effective for producing a liquid enriched in NOx at the bottom of the stripping column and a gas purified of NOx at the top of the stripping column;
   iii) withdrawing the liquid enriched in NOx from the bottom of the stripping column;
   iv) withdrawing the gas purified of NOx and cooling and partially condensing the gas purified of NOx in the first exchanger to form a second cooled fluid;
   v) introducing a liquid derived from the second cooled fluid to a distillation column for separation therein;
   vi) withdrawing a top gas from the distillation column and cheating the top gas in the first exchanger, wherein the top gas is enriched in oxygen and/or carbon monoxide with respect to the gas comprising carbon dioxide;
   vii) withdrawing a bottom liquid from the distillation column, wherein the bottom liquid is enriched in carbon dioxide with respect to the gas comprising carbon dioxide, wherein the bottom liquid is at a third pressure;
   viii) vaporizing a first portion of the bottom liquid in the first exchanger to produce a vaporized portion and returning the vaporized portion to the distillation column;
   ix) mixing a second portion of the bottom liquid with an expanded liquefied cycle gas to form a mixed cycle gas;
   x) dividing the mixed cycle gas into at least a first fraction and a second fraction and vaporizing the first fraction and the second fraction in the first exchanger, wherein the first fraction is at a first pressure that is lower than the third pressure when vaporized in the first exchanger, wherein the second fraction is at a second pressure that is equal to or lower than the third pressure when vaporized in the first exchanger;

xi) pressurizing the vaporized first fraction to the third pressure and combining the first fraction with at least the vaporized second fraction to form a final gas mixture;

xii) compressing the final gas mixture in a compressor and then condensing the compressed final gas mixture to form a liquid cycle fluid;

xiii) dividing the liquid cycle fluid into a liquid product and a liquefied cycle gas;

xiv) cooling the liquefied cycle gas in the first exchanger and expanding a first portion of the liquefied cycle gas to the third pressure to form the expanded liquefied cycle gas; and xv) feeding the top of the stripping column with a second portion of the liquefied cycle gas.

2. A process as claimed in claim 1, wherein the stripping column comprises an absence of a bottom reboiler or top condenser.

3. A process as claimed in claim 1, wherein the distillation column comprises an absence of a bottom reboiler.

4. A process as claimed in claim 1, wherein all of the bottom liquid from the distillation column is vaporized solely in the first exchanger.

5. The process as claimed in claim 1, wherein the heated top gas from step vi) is mixed with the gas comprising carbon dioxide upstream of the first exchanger.

6. The process as claimed in claim 1, wherein a gas derived from the second cooled fluid from step iv) is heated in the first exchanger and is reduced in pressure in a turbine.

7. The process as claimed in claim 1, wherein the gas comprising carbon dioxide originates from an oxy-combustion boiler and a the liquid enriched in NOx from the bottom of the stripping column is returned to the oxy-combustion boiler.

* * * * *